(12) United States Patent
Barends

(10) Patent No.: US 11,429,888 B2
(45) Date of Patent: *Aug. 30, 2022

(54) INDIVIDUAL QUBIT EXCITATION CONTROL WITH A GLOBAL EXCITATION DRIVE

(71) Applicant: Google LLC, Mountain View, CA (US)

(72) Inventor: Rami Barends, Goleta, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,846

(22) Filed: Oct. 23, 2020

(65) Prior Publication Data

US 2021/0042654 A1 Feb. 11, 2021

Related U.S. Application Data

(63) Continuation of application No. 16/731,268, filed on Dec. 31, 2019, now Pat. No. 10,846,609, which is a continuation of application No. 15/774,033, filed as application No. PCT/US2015/059484 on Nov. 6, 2015, now Pat. No. 10,572,815.

(51) Int. Cl.
   *G06N 10/00* (2022.01)
   *G06F 17/16* (2006.01)

(52) U.S. Cl.
   CPC .............. *G06N 10/00* (2019.01); *G06F 17/16* (2013.01)

(58) Field of Classification Search
   CPC ................................ G06N 10/00; G06F 17/16
   USPC .............................................................. 326/6
   See application file for complete search history.

(56) References Cited

U.S. PATENT DOCUMENTS

| | | | |
|---|---|---|---|
| 7,969,178 B2 | 6/2011 | Przybysz et al. | |
| 8,138,784 B2 | 3/2012 | Przybysz et al. | |
| 9,892,365 B2 | 2/2018 | Rigetti et al. | |
| (Continued) | | | |

FOREIGN PATENT DOCUMENTS

| | | |
|---|---|---|
| CN | 101118608 | 2/2008 |
| CN | 103563084 | 2/2014 |

OTHER PUBLICATIONS

Authorized Officer Ralf Abbing, International Search Report/ Written Opinion in PCT/US2015/059484, dated Sep. 14, 2016, 14 pages.

(Continued)

*Primary Examiner* — Don P Le
(74) *Attorney, Agent, or Firm* — Fish & Richardson P.C.

(57) ABSTRACT

Methods, systems, and apparatus for individual qubit excitation control with a global excitation drive. In one aspect, a method includes accessing a quantum system that comprises a plurality of qubits; a plurality of qubit frequency control lines, each qubit frequency control line corresponding to an individual qubit and controlling the frequency of the qubit; a driveline; a plurality of couplers, each coupler coupling a corresponding qubit to the driveline so that a plurality of qubits are coupled to the driveline; determining one or more qubits that require a rotation operation; for each qubit requiring a rotation operation: tuning the qubit frequency to the corresponding driveline frequency of the rotation operation; performing the rotation operation using a microwave pulse on the excitation drive; and tuning the qubit away from the driveline frequency of the rotation operation.

8 Claims, 6 Drawing Sheets

(56) References Cited

U.S. PATENT DOCUMENTS

| | | | |
|---|---|---|---|
| 10,222,416 | B1 | 3/2019 | Inamdar et al. |
| 10,354,198 | B1 | 7/2019 | Filipp et al. |
| 2004/0022332 | A1 | 2/2004 | Gupta et al. |
| 2005/0001209 | A1 | 1/2005 | Hilton et al. |
| 2005/0167772 | A1 | 8/2005 | Stoneham et al. |
| 2009/0322374 | A1 | 12/2009 | Przybysz et al. |
| 2011/0133770 | A1 | 6/2011 | Przybysz et al. |
| 2013/0009677 | A1 | 1/2013 | Naaman et al. |
| 2018/0322409 | A1 | 11/2018 | Barends |
| 2019/0237648 | A1 | 8/2019 | Przybysz et al. |
| 2019/0266512 | A1 | 8/2019 | Shen et al. |
| 2019/0303242 | A1 | 10/2019 | Kapit |
| 2019/0369171 | A1 | 12/2019 | Swenson et al. |
| 2019/0392917 | A1 | 12/2019 | Leipold et al. |
| 2020/0117698 | A1 | 4/2020 | Babbush |
| 2020/0387822 | A1* | 12/2020 | Kilmov ............ G06N 10/00 |
| 2021/0109707 | A1* | 4/2021 | McCarty ............ G06F 17/145 |

OTHER PUBLICATIONS

EP Office Action in European Application No. 15860042.9, dated Mar. 30, 2020, 8 pages.

PCT International Preliminary Report on Patentability issued in International Application No. PCT/US2015/059484, dated May 17, 2018, 8 pages.

Julian S. Kelly et al."Fault-tolerant superconducting qubits," Dissertation for Ph.D. in Physics at University of California, Mar. 1, 2015 (Mar. 1, 2015), XP055289024, ISBN: 978-1-321-69634-9, Retrieved from the Internet: URL:http://web.physics.ucsb.edu/ 'martinisgroup/theses/Kelly2015.pdf, [retrieved on Jul. 15, 2017] Chapter 3: "Coherent Josephson qubit suitable for scalable quantum intergrated circuits,"—in particular paragraphs 3.3 "Design" and 3.4 "Coherence" Chapter 4: Superconducting quantum circuits at the surface code threshold for fault tolerance in particular paragraphs 5.2-5.4; Appendix B: "Supplementary information for Chapter 4"—in particular paragraphs B.1.1, B.3, B.5 (Figure B.5) and B.6.

R. Barends et al. "Coherent Josephson Quibit Suitable for Scalable Wuantum Integrated Circuits," Physical Review Letters, vol. 333, No. 8, Aug. 22, 2013 (Aug. 22, 2013) p. 080502, XP055280123, US ISSN: 0031-9007, DOI: 10.1103/physrevlett.111.080502—the whole document.

Extended European Search Report in European Application No. 21167735.6, dated Jul. 14, 2021, 14 pages.

CN Office Action in Chinese Application No. 201580085601, dated May 31, 2021, 15 pages (with English translation).

* cited by examiner

INDIVIDUAL QUBIT EXCITATION CONTROL WITH A GLOBAL EXCITATION DRIVE

CROSS-REFERENCE TO RELATED APPLICATIONS

This application is a continuation application of, and claims priority to, U.S. patent application Ser. No. 16/731,268, titled "INDIVIDUAL QUBIT EXCITATION CONTROL," filed on Dec. 31, 2019, which is a continuation application of, and claims priority to, U.S. patent application Ser. No. 15/774,033, titled "INDIVIDUAL QUBIT EXCITATION CONTROL," filed on May 7, 2018, which is the country equivalent to WIPO Patent Application No. PCT/US2015/059484, titled "INDIVIDUAL QUBIT EXCITATION CONTROL," filed on Nov. 6, 2015. The disclosure of each of the foregoing applications is incorporated herein by reference.

BACKGROUND

Large-scale quantum computers have the potential to provide fast solutions to certain classes of difficult problems. For large-scale quantum computing to be realizable, several challenges in the design and implementation of quantum architecture to control and program quantum hardware must be overcome. Reducing the complexity of quantum architecture whilst maintaining a high level of control over the qubits included in the quantum architecture is a crucial step in building a scalable quantum computer.

SUMMARY

This specification relates to individual qubit excitation control in quantum systems. In particular, this specification describes technologies that use a global excitation driveline and individual qubit frequency control in order to achieve enhanced and refined controllability of qubits in a quantum device, including implementing different individual qubit excitations on different qubits in parallel and ensuring that quantum gates in the quantum device are made robust against pulse distortion.

In general, one innovative aspect of the subject matter described in this specification can be embodied in methods that include the actions of accessing a quantum system that comprises a plurality of qubits; a plurality of qubit frequency control lines, each qubit frequency control line corresponding to an individual qubit and controlling the frequency of the qubit; a driveline; a plurality of couplers, each coupler coupling a corresponding qubit to the driveline so that a plurality of qubits are coupled to the driveline; determining one or more qubits that require a rotation operation; for each qubit requiring a rotation operation: tuning the qubit frequency to the corresponding driveline frequency of the rotation operation; performing the rotation operation using a microwave pulse on the excitation drive; and tuning the qubit away from the driveline frequency of the rotation operation.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, tuning the qubit frequency to the corresponding driveline frequency of the rotation operation is performed by a rounded rectangular pulse.

In other implementations, the microwave pulse on the excitation drive has a shaped envelope.

In some aspects, different rotations are simultaneously performed on different qubits.

In other aspects, the different rotations simultaneously performed on the different qubits are performed using frequency domain multiplexing and qubit frequency tuning.

In some implementations, the microwave pulse is a single microwave pulse.

In other implementations, the microwave pulse comprises multiple microwave pulses.

In some cases, tuning the qubit away from the driveline frequency of the rotation operation is performed before a next pulse is applied to the driveline.

In other cases, the quantum system further comprises a qubit controller that generates excitation pulses on the driveline, each pulse corresponding to one of a plurality of quantum gate frequencies for a respective plurality of quantum gates; and controls individual frequencies of the plurality of qubits using the qubit frequency control lines so that, for each qubit, the qubit frequency is adjusted towards or away from a quantum gate frequency of a current pulse on the driveline.

In some implementations the qubit controller determines one or more qubits that require a rotation operation; and for each qubit requiring a rotation operation tunes the qubit frequency to a corresponding gate frequency of the rotation operation; and performs the rotation operation using a microwave pulse on the driveline.

In further implementations, the plurality of quantum gates include π and π/2 rotation gates about the X and Y axis.

The subject matter described in this specification can be implemented in particular embodiments so as to realize one or more of the following advantages.

A system implementing individual qubit excitation control with a global excitation driveline enables the construction of scalable quantum systems by reducing the complexity of the quantum architecture used for quantum computation while maintaining a high level of control over the qubits in the quantum architecture, as required, for example, in quantum algorithms such as quantum error correction schemes. The quantum hardware required to implement quantum computations in a quantum device may be simpler in a system implementing individual qubit excitation control with a global excitation driveline compared to other quantum computation systems. In particular, both the quantum hardware and control hardware in a system implementing individual qubit excitation control with a global excitation driveline may be simplified compared to other quantum computation systems, without losing the required functionality.

A system implementing individual qubit excitation control with a global excitation drive may achieve a higher level of performance than other quantum computation systems. For example, a system implementing individual qubit excitation control avoids the obstacle of routing many wires within the quantum computing system, in turn avoiding the coupling of many excitation control lines and qubits which leads to parasitic cross talk and detriments performance.

A system implementing individual qubit excitation control with a global excitation drive may be more robust against distortion than other quantum computation systems. For example, systems implementing frequency detuning algorithms that require a rectangular-like voltage pulse on the frequency control line of the qubit suffer from ubiquitous non-idealities in wiring, for example from filtering, that lead to rounding of the edges. By using shaped microwave pulses, a system implementing individual qubit excitation control may be highly robust against such distortion.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a method and apparatus to simplify the complexity of quantum hardware in a quantum system, e.g., quantum hardware in a quantum computation system, whilst maintaining a necessary level of control of the quantum system. The method and apparatus implement global excitation control using a single excitation driveline that may be coupled to all qubits in the quantum system together with individual qubit frequency control. By running excitation pulses along a global excitation driveline, and with different quantum gates at different frequencies, qubits in the quantum system may be individually tuned towards or away from the different frequencies of the quantum gates, allowing for individual excitation control.

Example Operating Environment

Figure 1A:
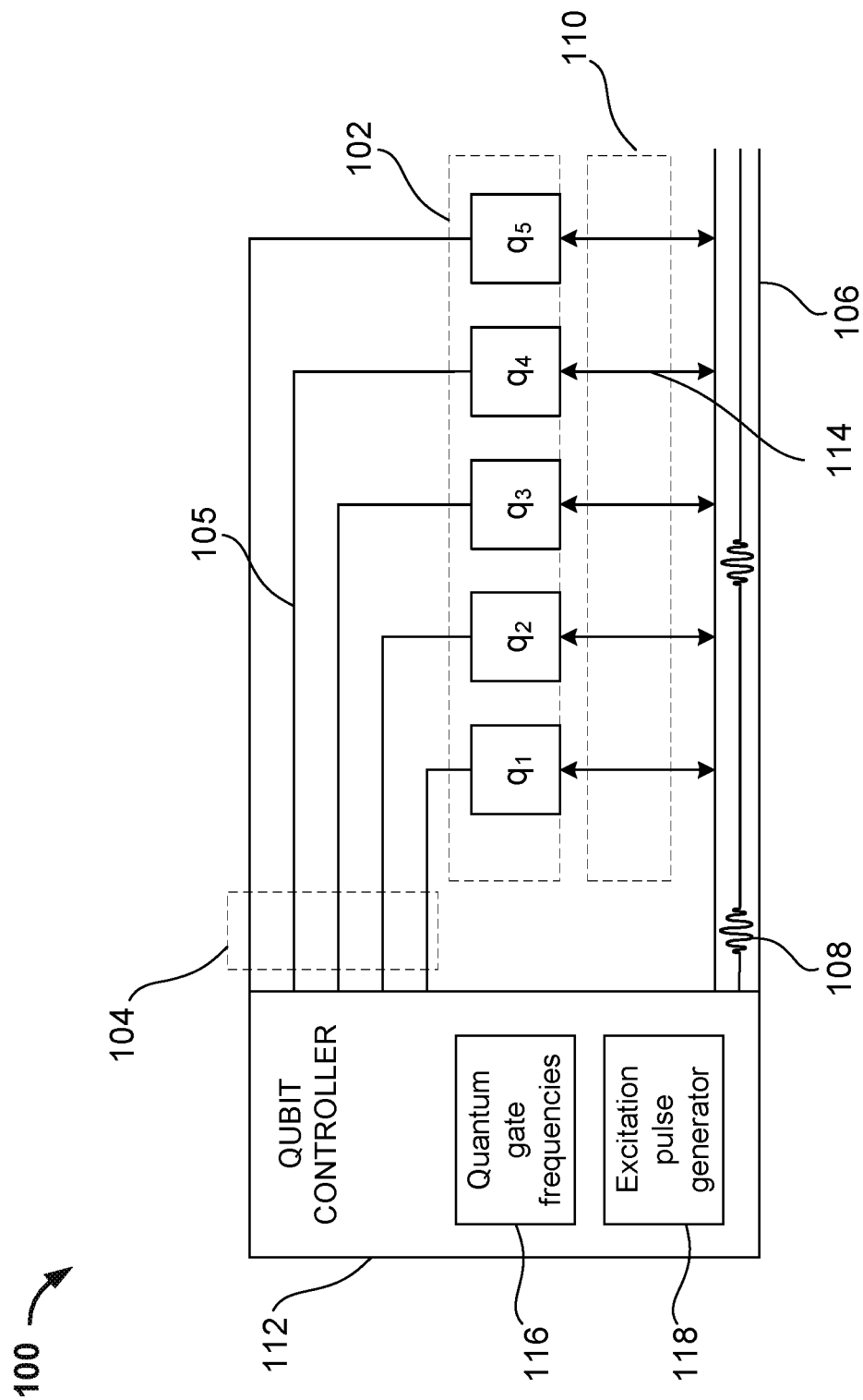
FIG. 1A depicts a one-dimensional schematic perspective of an example individual qubit excitation control system.

FIG. 1A depicts a one-dimensional schematic perspective of an example individual qubit excitation control system 100.

The system 100 includes a one dimensional array of qubits 102. For clarity, five qubits are depicted in FIG. 1A, however the system may include a larger number of qubits. Each of the qubits in the array of qubits 102 may be frequency-tunable.

The system 100 includes a set of qubit frequency control lines 104. Each qubit frequency control line corresponds to an individual qubit, for example qubit frequency control line 105 corresponds to individual qubit $q_4$. The qubit frequency control lines 104 control the frequency of the qubits 102. Each qubit frequency control line controls the frequency of its corresponding qubit, for example qubit frequency control line 105 controls the frequency of qubit $q_4$. In some implementations the wiring of the individual qubit frequency control lines 104 may be supplied by in-plane wiring. In other implementations the wiring of the individual qubit frequency control lines 104 may be supplied by out-plane wiring.

The system 100 includes a global excitation driveline 106. The global excitation driveline provides global excitation control of the qubits in the individual qubit excitation control system 100, e.g., qubits $q_1$-$q_5$ through a set of couplers, as described in the paragraph below. The global excitation driveline may be configured to run a continuous train of excitation pulses, e.g., excitation pulse 108, with different quantum gates at different frequencies. Each qubit in the individual qubit excitation control system 100 may be tuned towards or away from these frequencies on the global excitation driveline 106, allowing for individual qubit excitation control.

The system 100 includes a set of couplers 110. Each coupler in the set of couplers 110 couples a corresponding qubit to the global excitation driveline 106. For example, coupler 114 couples qubit $q_4$ to the global excitation driveline 106. In some implementations the couplers 110 couple each of the set of qubits 102 to a respective equal or highly similar length of the global excitation driveline 106. The couplers 110 may be any type of coupler, e.g., capacitive coupling. In order to achieve a capacitive coupling, a common microwave line may be run adjacent to a qubit capacitor, as described below with reference to FIG. 1B.

Each qubit $q_1$-$q_5$ may be coupled to the global excitation driveline 106 through a respective coupler. In some implementations, the vicinity of the qubits 102 induces capacitive coupling between the qubits 102 and the global excitation driveline 106. In some implementations each coupler in the set of couplers 110 may be of equal or highly similar strength. For example, each qubit may be coupled to an equal length of the global excitation driveline 106.

In some implementations, the qubits 102 may be dissimilarly coupled to the global excitation driveline 106. If the coupling variation is small, pulses with slightly different amplitudes can be sent along the global excitation driveline 106, either interleaved at a standard frequency on the global excitation driveline 106 or broadcast on another frequency. For example, if the variation in coupling is 4%, i.e., the coupling varies from 98% to 102% from the mean value, pulses may be interleaved with 99% and 101% amplitude.

If the coupling variation is large and there is only a specific set of different coupling values, extra pulses with specific amplitudes to match the variation may be used. Alternatively, if the coupling variation is large, the amplitude of the pulse may be left on at a small level for a longer period of time, and not turned off at the end of a shaped pulse. A qubit with a weaker coupling, and hence needing more signal, can reside at the broadcast frequency for longer. These dwell times can be achieved in a straightforward and parallel manner.

The system 100 includes a qubit controller 112. The qubit controller 112 may be configured to generate excitation pulses, for example excitation pulse 108, on the global excitation driveline 106 using an excitation pulse generator 118. Each excitation pulse generated by the qubit controller 112 corresponds to one of a set of quantum gate frequencies 116. The quantum gate frequencies 116 correspond to a set of quantum gates that include $\pi$ and $\pi/2$ rotation gates about the X and Y axis. The $\pi$ and $\pi/2$ rotation gates about the X and Y axis are a sufficient set of single qubit unitary gates required to implement a surface code error correction scheme. For quantum computation a physical T gate would also be required, e.g., a π/4 rotation gates about the Z axis. This could be implemented using frequency detuning lines. In order to implement a surface code error correction scheme, a two qubit controlled phase gate may additionally be implemented using frequency control (and no microwave drive). In addition, to implement surface code quantum computing, a T gate may additionally be implemented using frequency control (and no microwave drive).

The qubit controller 112 may also be configured to control the individual frequencies of the set of qubits 102 using the frequency control lines 104. The qubit controller 112 controls the individual frequencies of the set of qubits 102 such that the frequency of each qubit can be adjusted towards or away from a quantum gate frequency in the set of quantum gate frequencies 116 of a current excitation pulse on the global excitation driveline 106.

The qubit controller 112 may be further configured to determine when one or more qubits in the set of qubits 102 requires a rotation operation. Determining when and which sequence of the one or more qubits in the set of qubits 102 require a rotation operation is dependent on the computation being performed by the quantum system. For example, the qubit controller 112 may determine that qubit $q_4$ requires a rotation operation. For each qubit that requires a rotation operation, the qubit controller 112 may be configured to tune the frequency of the qubit to a corresponding quantum gate frequency of the rotation operation and perform the rotation operation using a microwave pulse on the global excitation driveline 106. For example, having determined that qubit $q_4$ requires a rotation operation, the qubit controller 112 may tune the frequency of qubit $q_4$ to the corresponding quantum gate frequency of the rotation operation and perform the rotation operation using microwave pulse 108 on the global excitation driveline 106.

The type of qubit controller 112 that the system 100 utilizes is dependent on the type of qubits the system uses. As an example, qubits that are realized via atomic, molecular or solid-state quantum systems typically have energy separation of the relevant qubit levels in the microwave or optical domain. The states of such qubit may be manipulated and controlled using external fields, such as microwave or optical fields. In such cases, as an example, mode-locked lasers may serve as qubit controllers due to their broad-band optical spectra that feature both radio frequency and microwave structure. In another example, the qubit controller could include a collection of individual qubit controllers realized by a radio frequency generator as well as one or a collection of global excitation controllers realized by a radio frequency or microwave generator. In both cases, the qubit controller may be operated manually or connected to a computer and controlled via suitable software allowing for specifying and automatically running the required qubit operations.

Figure 1B:
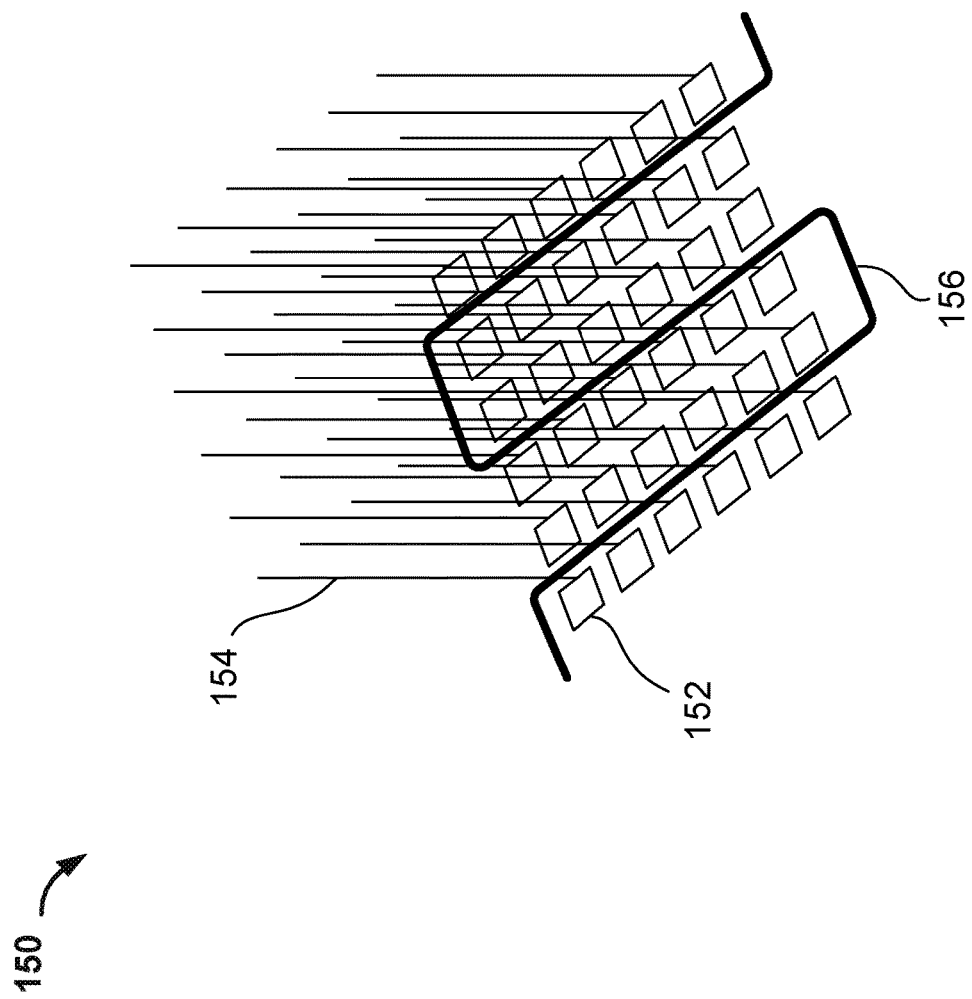
FIG. 1B depicts a two-dimensional schematic perspective of qubits in an example individual qubit excitation control system.

FIG. 1B depicts a two-dimensional schematic perspective 150 of qubits in an example individual qubit excitation control system. FIG. 1B illustrates the scalability of the system 100 of FIG. 1A to higher dimensions. The perspective includes a two-dimensional array of qubits 152. Again, for clarity, thirty-six qubits are depicted in FIG. 1B, however the system may include a larger number of qubits. The qubits 152 each have individual frequency control.

The scheme 150 includes a set of qubit frequency control lines 154. As described above with reference to FIG. 1A, each qubit frequency control line in the set of qubit frequency control lines 154 corresponds to an individual qubit in the set of qubits 152. Each qubit frequency control line controls the frequency of its corresponding qubit. As illustrated in FIG. 1B, the wiring of the individual qubit frequency control lines 154 may be supplied by out-of-plane wiring from the top. In other implementations the wiring of the individual qubit frequency control lines 154 may be supplied by out-of-plane wiring from the bottom, or in-plane wiring schemes.

The scheme 150 includes a global excitation driveline 156. Unlike in the one-dimensional system of FIG. 1A, the global excitation driveline meanders through the qubit array and takes a serpentine path in two dimensions through the set of qubits 152, such that each qubit in the two-dimensional array of qubits may be coupled to the global excitation driveline 156. Each qubit in the two-dimensional array of qubits may be coupled to the global excitation driveline 156 with equal or highly similar strength. This may be achieved, for example, by coupling each qubit in the two-dimensional array of qubits to an equal length of the global excitation driveline.

The scheme 150 illustrates the scalability of the individual qubit excitation control system 100. For example, in order to extend the system to three dimensions, the system could include several layers of qubits 152 stacked on top of one another, forming a three dimensional lattice. In some implementations, a three dimensional individual qubit excitation control system may include a single global excitation driveline meandering through the qubit arrays and taking a serpentine path in three dimensions through the stacked levels of qubits.

In other implementations, such as large scale systems, it may be beneficial to include more than one excitation driveline, wherein each excitation driveline may be coupled to a large number of qubits. Such an implementation would still include a greatly reduced number of drivelines compared to other qubit excitation control systems. For example, for a system with 256 qubits, four drivelines, each coupled to a respective proper subset of 64 qubits, may be used.

A frequency detuning operation for a particular qubit requires a rectangular-like pulse on the frequency control line of the qubit. Non-idealities in wiring, for example from filtering, which may be ubiquitous in such systems, can lead to rounding of the edges of the rectangular-like voltage pulse. However, by using shaped microwave pulses, a method for achieving individual global excitation control with a global excitation driveline may be made highly robust against such distortion.

Achieving Individual Qubit Excitation Control

Figure 2:
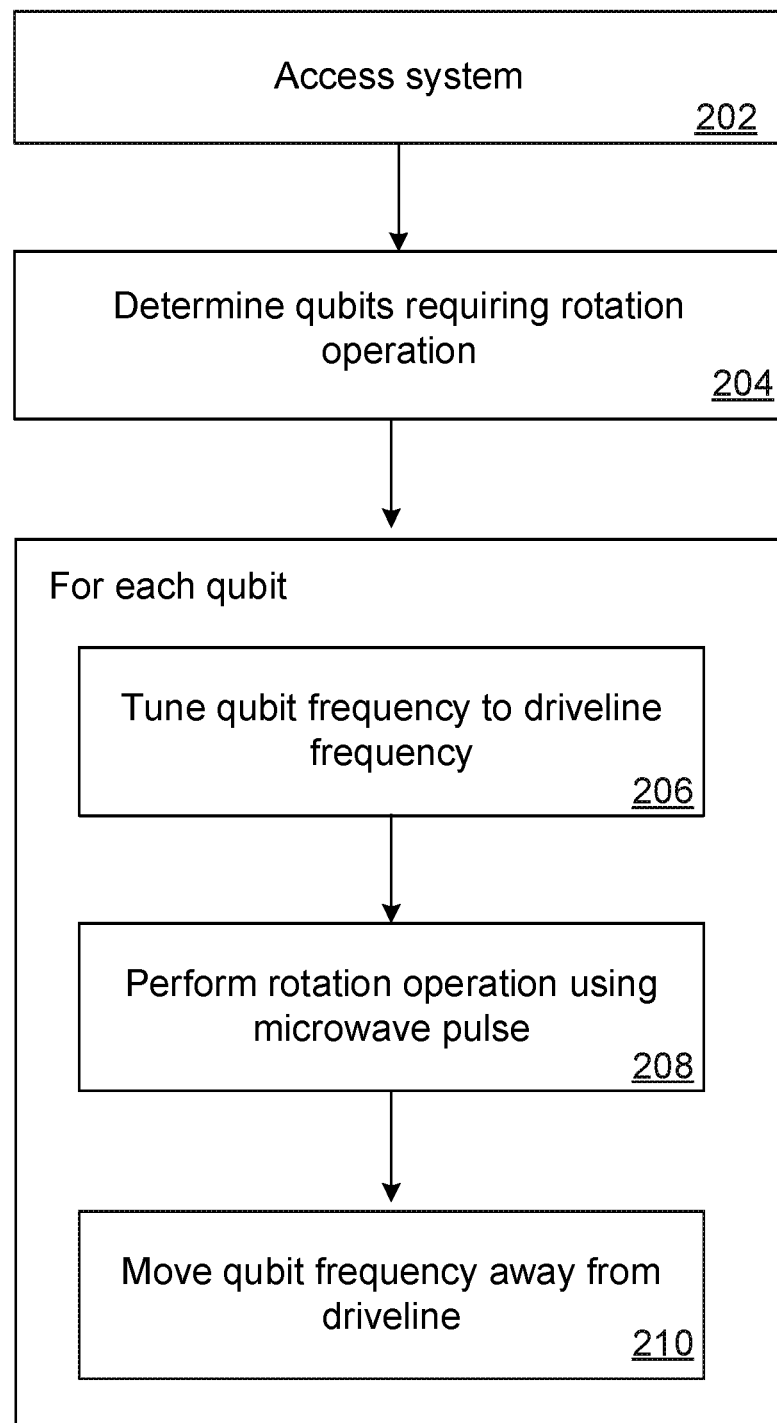
FIG. 2 is a flow diagram of an example process for individual qubit excitation control.

FIG. 2 is a flow diagram of an example process 200 for individually controlling qubit excitations. For example, the process 200 can be implemented using the qubit controller 112 of system 100 described above with reference to FIG. 1A.

The process accesses a system, such as the system 100 described above with reference to FIGS. 1A and 1B (step 202). The accessed system includes a collection of qubits, such as qubits 102 described above with reference to FIG. 1A, and a collection of qubit frequency control lines, such as frequency control lines 104 described above with reference to FIG. 1A, that each correspond to an individual qubit. The qubit frequency control lines control the frequency of the corresponding qubit to which it corresponds to. The accessed system further includes a global excitation driveline, such as driveline 106 described above with reference to FIG. 1A, which may be coupled to each of the set of qubits.

The process determines that one or more of the qubits in the set of qubits require a rotation operation (step 204). In some implementations, the process may determine that different rotations are required to be performed on different qubits. In some implementations, the different rotations may be performed in parallel on their corresponding qubits.

For each qubit that is determined to require a rotation operation, the process tunes the qubit frequency to the corresponding driveline frequency of the respective rotation operation (step 206). The process may tune the qubit frequency to the corresponding driveline frequency of the respective rotation operation using a rounded rectangular pulse. Tuning a qubit frequency to a corresponding driveline frequency of a respective rotation operation using qubit frequency control is described in more detail below with reference to FIGS. 3A and 3B.

The process performs the required rotation operation on each qubit determined to require a rotation operation in step 204 (step 208). In some implementations, the process may simultaneously perform different rotations on different qubits. The different rotations may be simultaneously performed on different qubits using frequency domain multiplexing and qubit frequency tuning. The process performs the required rotation operations using a microwave pulse on the excitation driveline. The microwave pulse on the excitation driveline may have a shaped envelope. In some implementations, the microwave pulse may be a single microwave pulse. In other implementations, the microwave pulse includes multiple microwave pulses.

The process moves the qubit frequency away from the driveline (step 210). The process moves the qubit frequency away from the driveline before the next pulse is applied to the global excitation driveline. For example, the process may move the qubit frequency such that the qubit returns to the original frequency of the qubit prior to step 206.

Figure 3A:
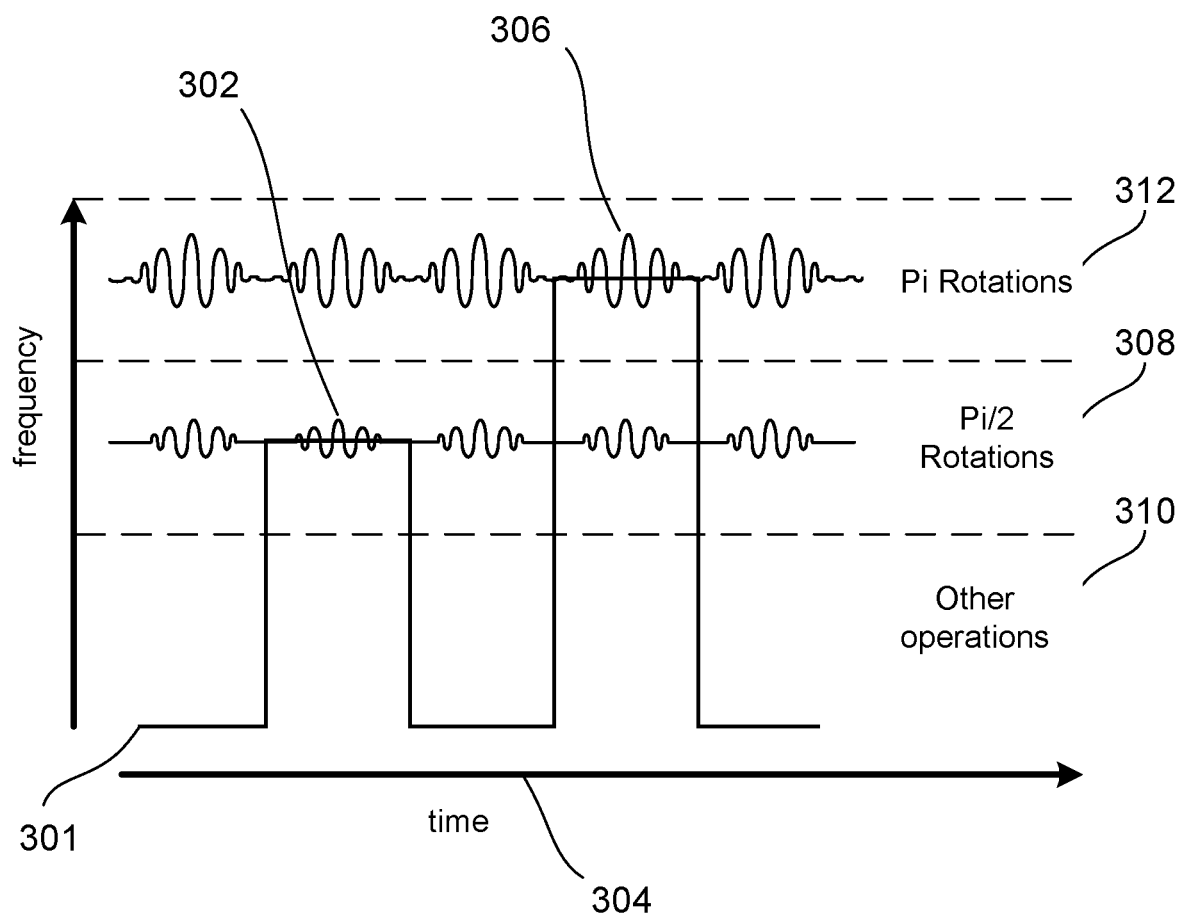
FIGS. 3A and 3B depict an example of qubit excitation control using qubit frequency control.

FIG. 3A depicts an example of single qubit excitation control using individual qubit frequency control 300. For example, the single qubit excitation control 300 may be implemented by a qubit controller, such as qubit controller 112, on a qubit such as any one of qubits $q_1$-$q_5$, using a global excitation driveline, such as global excitation driveline 106, all described above with reference to FIG. 1A. The example of single qubit excitation control 300 illustrates the tuning of the qubit to a frequency where a specific gate may be broadcast on a global excitation driveline, achieving single qubit excitation control. In FIG. 3A, the vertical axis depicts the qubit frequency and the horizontal axis depicts time.

The qubit frequency may first be at a starting frequency, as depicted by the horizontal line 314. When the qubit is idling, or performing other operations, the qubit remains in the frequency region 310. The qubit may then be tuned to a specific frequency only when the qubit needs to have a rotation, such as a $\pi/2$ or $\pi$ around the X or Y axes, and remains at the corresponding frequency to tune to single or multiple microwave pulses broadcast on the global excitation driveline.

The trajectory of the qubit frequency in time 301, e.g., the rectangular pulse labeled at certain times 302, 304, and 306, shows that the qubit first achieves a $\pi/2$ rotation, as depicted by the horizontal line 302. For example, a qubit controller may tune the frequency of the qubit using a corresponding qubit frequency control line to achieve the $\pi/2$ rotation by tuning the qubit frequency to the $\pi/2$ rotation region 308. The qubit frequency remains in the $\pi/2$ rotation region 308 to tune to the corresponding single or microwave pulses broadcast on the global excitation driveline.

The trajectory of the qubit frequency in time 301 then shows that the qubit returns to the starting frequency, as depicted by the horizontal line 304. For example, a qubit controller may tune the frequency of the qubit using a corresponding qubit frequency control line to return the qubit to the starting qubit frequency by tuning the qubit frequency to the region 310.

The trajectory of the qubit frequency in time 301 then shows that the qubit achieves a $\pi$ rotation, as depicted by the horizontal line 306. For example, a qubit controller may tune the frequency of the qubit using a corresponding qubit frequency control line to achieve the a rotation by tuning the qubit frequency to the T rotation region 312. The qubit frequency remains in the a rotation region 312 to tune to the corresponding single or microwave pulses broadcast on the global excitation driveline. For clarity, FIG. 3A depicts only the $\pi/2$ and $\pi$ control regions 308 and 312, respectively. However, a more complete set of rotations, including rotations around other axes, can be implemented in a similar manner. The $\pi/2$ and $\pi$ rotations around the X and Y axes are a minimal set of single qubit quantum gates required to implement a surface code error correction scheme.

The example of single qubit excitation control 300 may be performed in parallel to different qubits in an individual qubit excitation control system, such as individual qubit excitation control system 100 described above with reference to FIG. 1A. Furthermore, the different qubits can undergo different rotations in parallel.

Figure 3B:
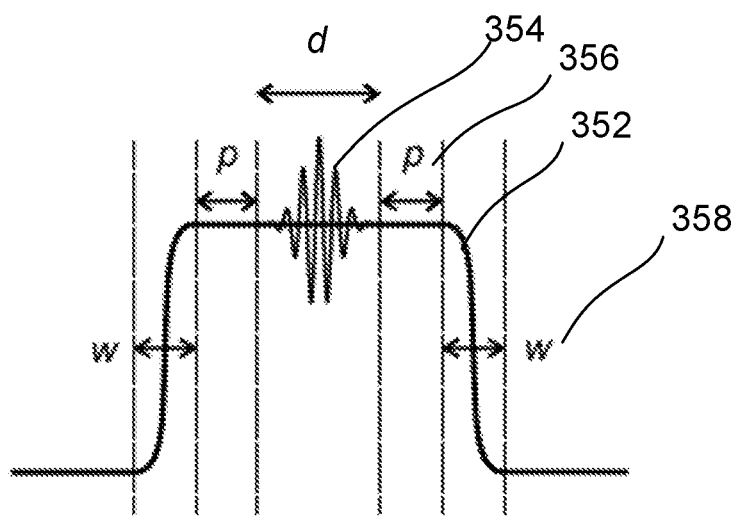

FIG. 3B depicts an example single qubit excitation control using individual qubit frequency control 350.

A qubit frequency detuning operation may be performed by the rounded rectangular shaped pulse 352. For example, the single qubit excitation control using individual qubit frequency control depicts a qubit moving from an idling frequency, e.g., the frequency representing region 310 in FIG. 3A above, to a broadcast frequency, e.g., the frequency representing one of the regions 306 and 308 in FIG. 3 above, and returning to the idling frequency using a rounded rectangular shaped pulse, as shown by pulse 352.

A qubit excitation operation may be performed by the microwave pulse with a shaped envelope 354. For example, once the qubit has moved in frequency from the idling frequency to the broadcast frequency, as achieved by the rounded rectangular shaped pulse 352, a microwave pulse with a shaped envelope 354 may be applied. The duration that the microwave pulse with a shaped envelope 354 may be applied is the radio frequency pulse duration d. The pulse ramp width, w, is the width between moving the qubit in frequency from the idling frequency to the broadcast frequency. The padding, p, is the width between the qubit frequency achieving the broadcast frequency and the beginning of the application of the microwave pulse with shaped envelope 354, or the width between the end of the application of the microwave pulse with shaped envelope 354 and the qubit frequency leaving the broadcast frequency.

Figure 4:
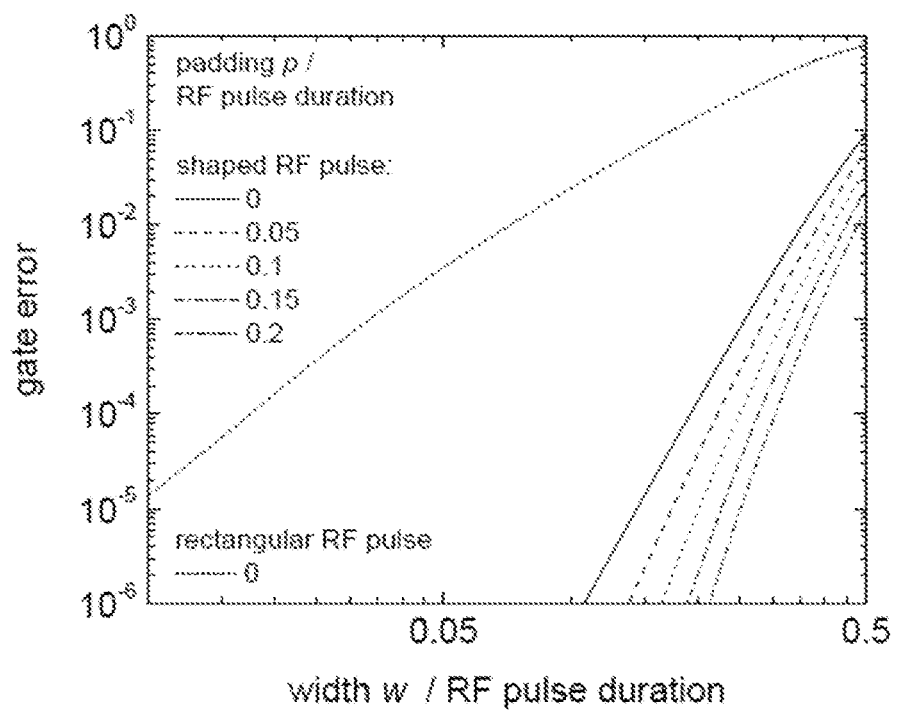
FIG. 4 is an example plot of gate error versus ratio of pulse ramp width over radio frequency pulse duration for an excitation operation.

FIG. 4 is an example graph 400 of gate error versus ratio of pulse ramp width, w, over radio frequency (RF) pulse duration, d, for an excitation operation, such as that depicted above in FIG. 3B. The graph has been produced using 20 ns for the RF pulse duration d, and a difference between the qubit idle frequency, e.g., the frequency representing region 410 in FIG. 3A above, and broadcast frequency, e.g., the frequency representing one of the regions 306 and 308 in FIG. 3A above, of 1 GHz.

The graph includes five different plots for different amounts of padding, for example the padding 356 described above with reference to FIG. 3B. The values of the padding included in the graph are p=0, 0.05, 0.1, 0.15 and 0.2, and are shown by the solid lines. For comparison, the effect of a rectangular RF pulse, e.g., a continuous tone, is plotted, as shown by the dashed line. The error of the rectangular RF pulse is orders of magnitudes larger, emphasizing that the gate may not be robust but rather highly sensitive to distortion. For the rectangular RF pulse, p=0 since the padding will not suppress the gate error.

The graph shows the gate error versus ratio of pulse ramp width over RF pulse duration for an excitation operation. The gate error remains below $10^{-4}$ for a ratio of w/d of 20%. By increasing the padding p, gate errors can be strongly reduced. The gate operation may be robust against distortion of the frequency control pulse.

Embodiments of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Embodiments of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus comprising:
   a qubit controller that is configured to:
   connect to a single driveline, generate excitation pulses, and apply the excitation pulses to the single driveline, wherein each pulse corresponds to one of a plurality of quantum gate frequencies for a respective plurality of quantum gates; and
   connect to a plurality of qubit frequency control lines and control individual frequencies of a respectively plurality of qubits connected to the plurality of qubit frequency control lines so that, for each qubit, the qubit frequency is adjusted towards or away from a quantum gate frequency of a current pulse on the driveline.

2. The apparatus of claim 1, wherein the qubit controller is further configured to:
   determine one or more qubits that require a rotation operation; and
   for each qubit requiring a rotation operation:
   tune the qubit frequency to a corresponding gate frequency of the rotation operation, and
   perform the rotation operation using a microwave pulse on the driveline.

3. The apparatus of claim 1, wherein the apparatus further comprises the plurality of qubits and the driveline, and wherein each qubit of the plurality of qubits is coupled to an equal or highly similar length of the driveline.

4. The apparatus of claim 1, wherein the apparatus further comprises the plurality of qubits and the driveline, and wherein each qubit of the plurality of qubits is coupled to a dissimilar length of the driveline.

5. The apparatus of claim 1, wherein the plurality of quantum gates comprise $\pi$ and $\pi/2$ rotation gates about the X and Y axis.

6. The apparatus of claim 1, wherein the apparatus further comprises the individual qubit frequency control lines, and wherein wiring of the individual qubit frequency control lines is supplied by in-plane wiring.

7. The apparatus of claim 1, wherein the apparatus further comprises the individual qubit frequency control lines, and wherein wiring of the individual qubit frequency control lines is supplied by out-plane wiring.

8. The apparatus of claim 1, wherein the apparatus further comprises a plurality of couplers, each coupler coupling a corresponding qubit to the driveline so that a plurality of qubits are coupled to the driveline, and wherein the plurality of couplers are of equal or highly similar strength.

* * * * *